United States Patent [19]

Amarant et al.

[11] Patent Number: 5,592,539

[45] Date of Patent: Jan. 7, 1997

[54] SYSTEM FOR COMPLETING AIR-TO-GROUND TELEPHONE CALLS

[75] Inventors: Brenda B. Amarant, South Orange; Erik N. Breden, Holmdel; Thomas A. Dunn, Edison; Michael W. Funk, Mountainside; Stephen M. Kocan, Fairfield, all of N.J.; Ilane L. Mathews, Pataskala, Ohio; Kari O'Connell, Bridgewater; Mark C. Pollman, Old Bridge, both of N.J.

[73] Assignee: AT&T, Holmdel, N.J.

[21] Appl. No.: 176,006

[22] Filed: Dec. 30, 1993

[51] Int. Cl.$^6$ .......................... H04M 15/00; H04M 17/00
[52] U.S. Cl. ..................... 379/112; 379/111; 379/113; 379/114; 379/115; 379/144
[58] Field of Search .................. 379/111–116, 144, 379/58, 59, 60, 91; 455/34.1, 56.1, 98

[56] References Cited

U.S. PATENT DOCUMENTS

| | | | |
|---|---|---|---|
| 4,419,766 | 12/1983 | Goeken | 379/59 |
| 4,876,738 | 10/1989 | Selby | 379/59 |
| 4,903,298 | 2/1990 | Cline | 455/98 |
| 4,987,587 | 1/1991 | Jolissaint | 379/113 |
| 5,123,112 | 6/1992 | Choate | 455/56.1 |
| 5,131,027 | 7/1992 | Hird | 379/112 |
| 5,144,649 | 9/1992 | Zicker | 379/144 |
| 5,173,594 | 12/1992 | McClure | 379/116 |
| 5,233,642 | 8/1993 | Renton | 379/111 |
| 5,251,248 | 10/1993 | Tokunaga | 379/112 |
| 5,278,891 | 1/1994 | Bhagat | 379/58 |
| 5,287,403 | 2/1994 | Atkins | 379/144 |
| 5,291,543 | 3/1994 | Freese | 379/114 |
| 5,301,223 | 4/1994 | Amadon | 379/112 |

OTHER PUBLICATIONS

K. Ogawa, "Present and Future Mobile Communications Services", *Japan Telecommunications Review*, vol. 29, No. 4, Oct. 1987, pp. 65–73.

*Primary Examiner*—Wellington Chin
*Assistant Examiner*—Vijay Shankar
*Attorney, Agent, or Firm*—Stephen M. Gurey; Barry H. Freedman

[57] ABSTRACT

A system for completing air-to-ground telephone calls is arranged so that a call originating from an aircraft is received in a ground station and directed to a special purpose platform disposed in the land-based telecommunications network. The platform, which may be implemented as an interactive voice response system, includes the capability to interact with the caller by (a) collecting billing information, which may be a commercial credit card or a telephone calling card, or other billing mechanism which can be initiated by a request for connection to a telephone operator; (b) validating credit cards and telephone calling cards by initiating a query and receiving a response from elements in the telecommunications network or from an external database; (c) providing auxiliary features such as block calling, free calls, speed dialing, sequence calling, etc.; and (d) depending upon the type of call involved, completing the call as either a traditional 1+long distance call, or as a 0+(e.g., operator assisted) call. After completion of each call, an automated message accounting (AMA) billing record is created and transmitted to the network, for bill processing.

6 Claims, 5 Drawing Sheets

SYSTEM FOR COMPLETING AIR-TO-GROUND TELEPHONE CALLS

FIELD OF THE INVENTION

This invention relates generally to telecommunications services, and in particular, to communications between a caller on an aircraft and a called party on the ground.

1. Background of the Invention

At the present time, persons traveling on aircraft have a very limited ability to originate telephone calls to called parties on the ground. Today, the caller must have a commercial credit card or a telephone calling (credit) card in their possession, in order to originate a call. The call, when placed, is directed to a ground station by radio transmission, where it is then routed to a PBX. The PBX captures billing information concerning the credit card or telephone calling card, the dialed number, and then places a 1+ (conventional long distance) call to the destination. The caller cannot ordinarily obtain the assistance of a telephone operator for call completion, so that the caller cannot make collect, bill to third number, person to person, or other similar types of calls. In some arrangements, the caller may be able to signal the PBX to connect the call to a local attendant; however, the attendant has capabilities that are much more limited than those of a telephone operator, so that the services enumerated above still cannot be obtained.

If a person on the airplane is not in possession of a credit card or a calling card, that person presently cannot initiate a telephone call. This is because the present system does not perform card validation in real time; accordingly, security is provided by requiring the caller to have physical possession of a card. If a caller were allowed to simply enter a card number, the possibility of abuse would be great, since even an invalid number could be used to initiate calls.

2. Summary of the Invention

In accordance with the present invention, a system for completing air-to-ground telephone calls is arranged so that a call originating from an aircraft is received in a ground station and directed to a special purpose platform disposed in the land-based telecommunications network. The platform, which may be implemented as an interactive voice response system, includes the capability to interact with the caller by (a) collecting billing information, which may be a commercial credit card or a telephone calling card, or other billing mechanism which can be initiated by a request for connection to a telephone operator; (b) validating credit cards and telephone calling cards by initiating a query and receiving a response from elements in the telecommunications network or from an external database; (c) providing auxiliary features such as block calling, free calls, speed dialing, sequence calling, etc.; and (d) depending upon the type of call involved, completing the call as either a traditional 1+ long distance call, or as a 0+ (e.g., operator assisted) call. After completion of each call, an automated message accounting (AMA) billing record is created and transmitted to the network, for bill processing.

BRIEF DESCRIPTION OF THE DRAWING

The present invention will be more fully appreciated by consideration of the following detailed description, which should be read in light of the accompanying drawing in which.

DETAILED DESCRIPTION

A system for completing air-to-ground telephone calls arranged in accordance with the present invention includes an interactive call processing platform designated generally as 102 which is connected via the switched telecommunications network 105 to a ground station 101. Ground station 101 is conventional, and includes telecommunications call completion equipment located on the ground which enables telecommunication, via a two-way radio link, between equipment designated generally as 100 on the aircraft, and platform 102.

Figure 1:
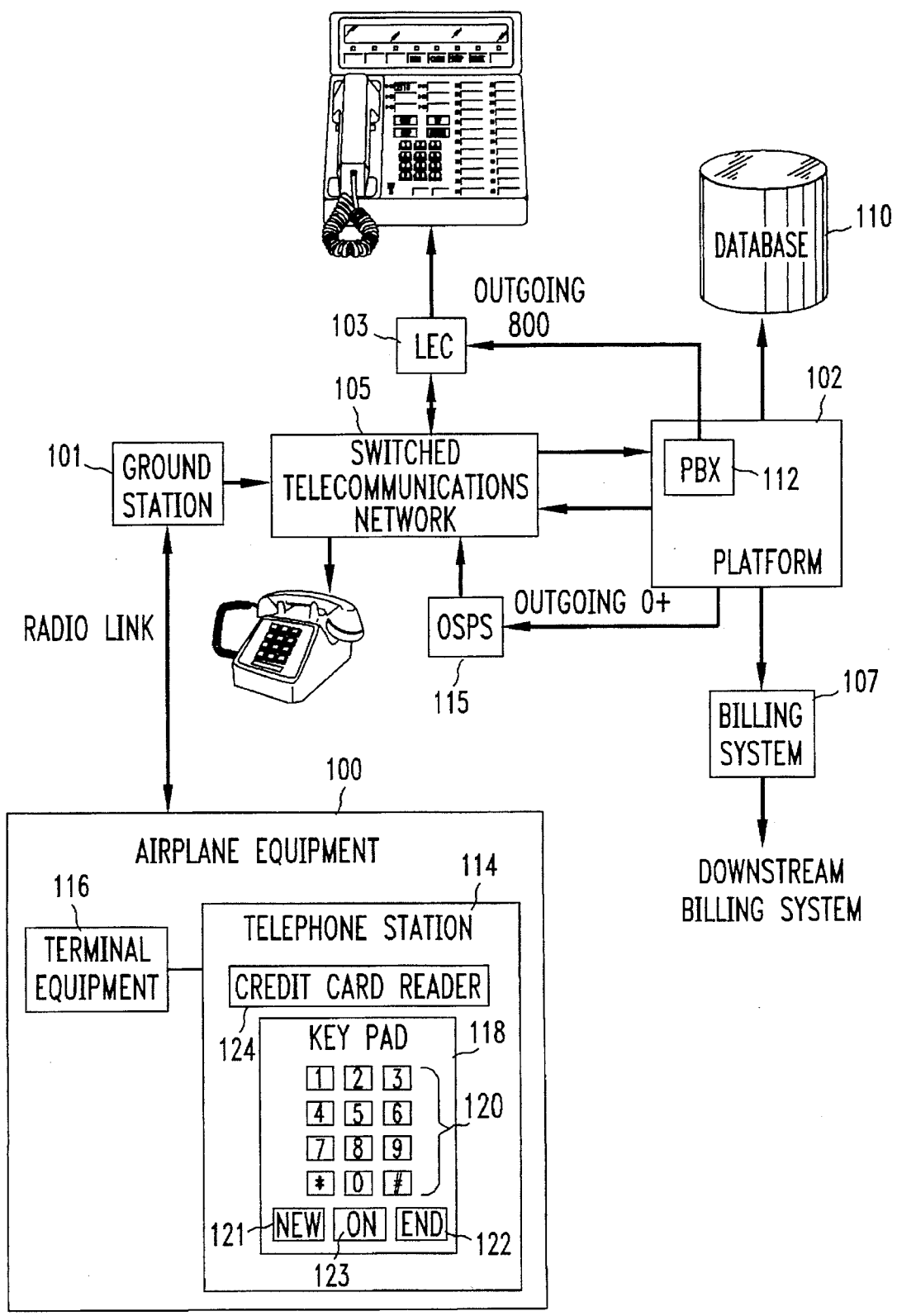
FIG. 1 is a block diagram of a system for completing air-to-ground telephone calls arranged in accordance with the present invention.

Generally speaking, platform 102 accepts calls from ground station 101, performs call set-up, interacts with the caller, and routes call to the desired destination (including other switching elements). Platform 102 also maintains call specific data, as well as administrative data for the platform itself. Platform 102 can also perform credit card validation in cooperation with external databases, and generate automatic message accounting (AMA) records used for billing purposes. These functions are discussed in more detail below. Also shown in FIG. 1 is a switch 115, which is arranged to receive certain outgoing calls from platform 102. OSPS 115 may be a 5ESS electronic switching system arranged to function as an Operator Services Position System (OSPS). This equipment is available from AT&T and others, and, as is well known by persons skilled in the art, can be arranged to accept all 0+ (automated) and 0– ( Operator Assisted) calls from platform 102, interact with the caller, create AMA records for calls, and route each call to the desired destination via the remaining elements of switched telecommunications network 105.

Equipment 100 located on an aircraft includes a telephone station 114 as well as the associated terminal equipment 116 that is used to communicate between the telephone station 114 and ground station 101. Advantageously, telephone station 114 includes a key pad 118 having conventional alphanumeric input buttons 120 as well as separate "NEW" and "END" buttons 121 and 122, which can be used to initiate sequence calls and terminate a call, respectively. Telephone station 114 also includes a credit card reader 124, into which a credit card can be inserted or swiped, so that the coded information contained on the card can be read and transmitted to platform 102.

Figure 2:
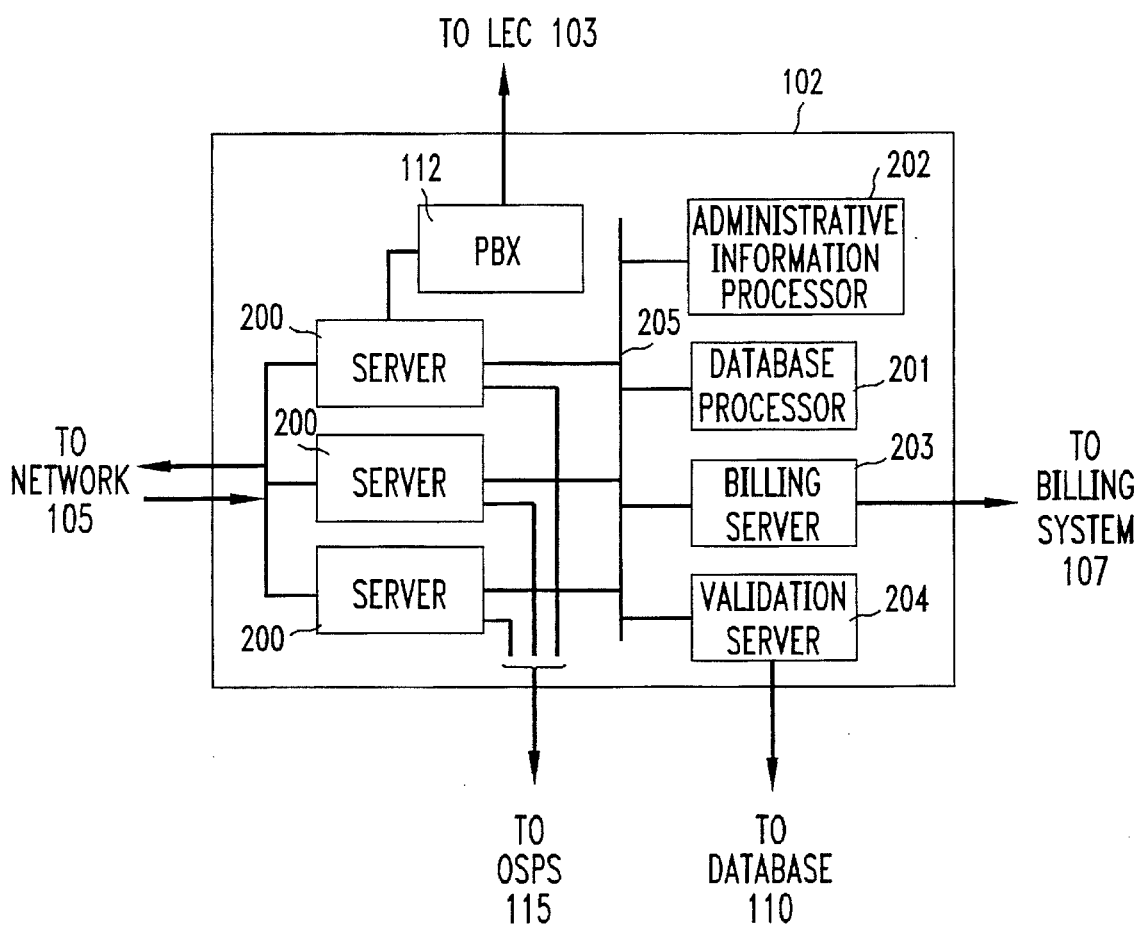
FIG. 2 is a block diagram illustrating in more detail the arrangement of platform 102 of FIG. 1.

Referring now to FIG. 2, there is shown a block diagram illustrating in more detail the arrangement of platform 102 of FIG. 1. A plurality of servers 200 provide interactive voice processing so that prompts may be given to a caller, digits dialed by the caller may be received and interpreted, and swiped credit or calling card data received from credit card reader 124 can be interpreted. Servers 200 are also arranged to perform traditional call setup functions, such as generating and recognizing supervisory signals. They are also arranged to accept call specific signaling from ground station 101, which, as indicated below, represents information specific to the aircraft, the telephone station equipment on the aircraft, etc. Servers 200 are directly connected to and interact with both OSPS 115, for the purpose of call validation and operator services, and with switched telecommunications network 105, for the purpose of completing 1+

(conventional long distance) calls. Servers 200 may be implemented using a CONVERSANT Voice Information System available from AT&T.

An administrative information processor 202 is used to maintain general administrative data needed for the ordinary operation of platform 102. Such administrative information typically includes the number of times that platform 102 should prompt a caller for information (before the call is disconnected); allowable card types; allowable parameter ranges, and so on. Administrative information processor 202 can be implemented using a personal computer.

A database processor 201 is used to maintain active call data. This includes billing information, call ID information, destination numbers, etc. All of this information relates to a particular call session. Database processor 201 may also be implemented using a personal computer, and is arranged to handle data associated with multiple simultaneous calls.

Billing server 203 is used to generate AMA (billing) records and any other call specific records needed to appropriately charge the caller for a call. Server 203 may also be implemented using a personal computer.

Figure 3:
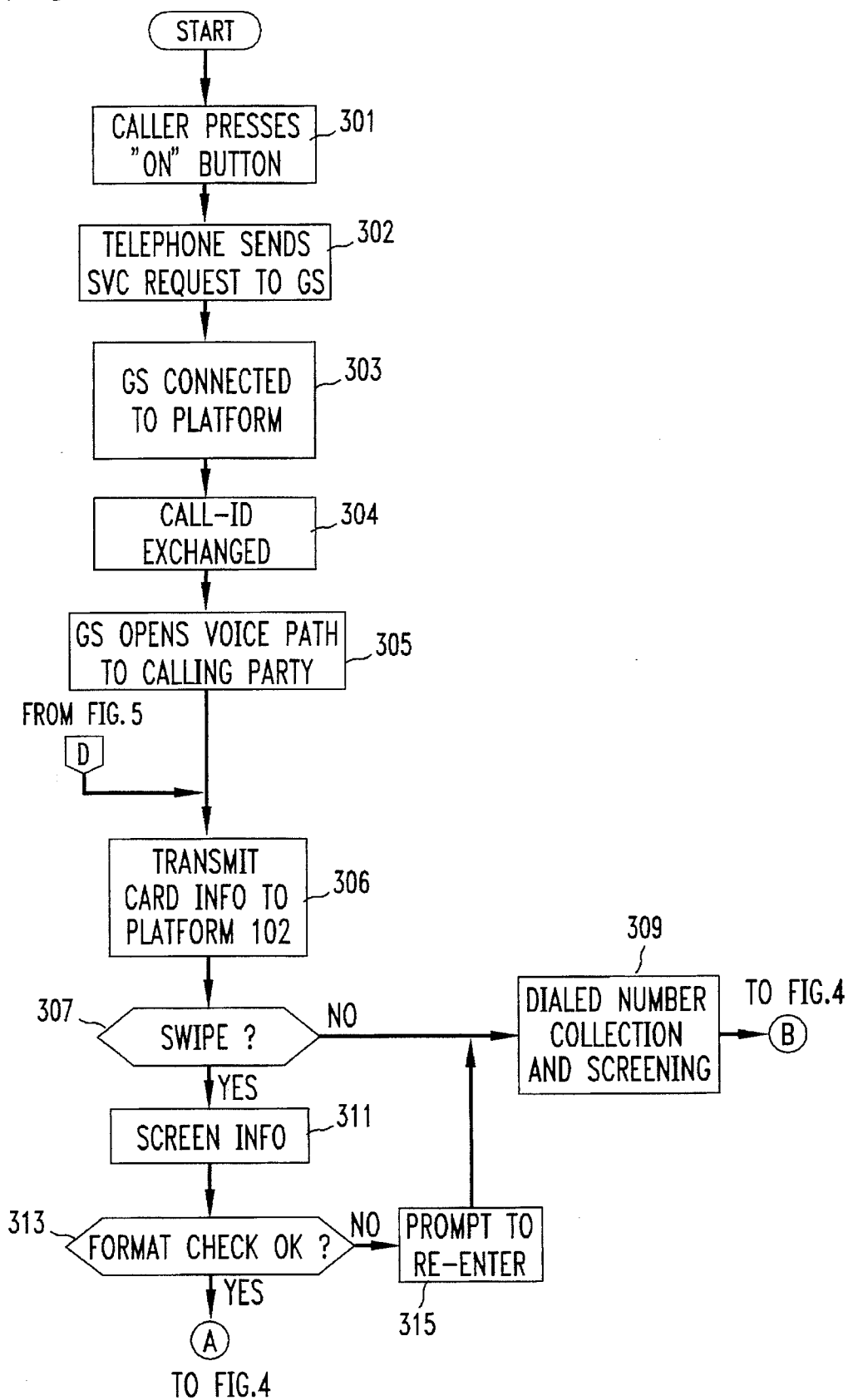
FIGS. 3–5 are flow charts illustrating the process performed in the system of FIG. 1 when an air to ground telephone call is initiated.

Validation server 204 is used to interact with an external database, such as database 110 in FIG. 1. Server 204 is arranged to generate queries, and receive and interpret responses. For example, it is used in formulating and transmitting queries with respect to commercial credit cards, to validation data bases such as database 110, and to receive and interpret responses indicating whether or not particular cards are valid or invalid. Server 204 may also be implemented using a personal computer Referring now to FIG. 3, a call is initiated when a caller presses "ON" button 123 on telephone station 114, in step 301. Terminal equipment 116 responds by sending a service request forward to ground station 101, in step 302. Ground station 101 establishes a telephone connection to platform 102 in step 303. This is typically done by going off-hook and dialing digits to reach the platform. Once connected to platform 102, ground station 101 sends a multi-digit Call-Identifier (Call-ID) in step 304, typically using DTMF signaling. This information includes who is calling, and specifically, information identifying the aircraft and the particular telephone station on the aircraft, the time and date of the call origination, and the identity of which ground station received the call. Platform 102 receives and records the multi-digit Call-ID information in database processor 201. If the Call-ID transmission is successful, platform 102 acknowledges receipt of the multi-digit Call-ID, for example, with a DTMF "D" signal. If the Call-ID transmission fails, platform 102 sends a different signal, for example, a DTMF "C", towards ground station 101. If the Call-ID transmission fails after a second attempt (or some predetermined value), ground station 101 clears the call connection. The number of attempts that are made is administered in platform 102, using information stored in administrative information processor 202.

Once successful Call-ID transmission has occurred in step 304, platform 102 returns dial tone to the calling party in step 305. At this point, platform 102 is ready to accept input from the caller, and the caller may either (1) enter their destination number and manually enter a credit card or calling card number, or (2) insert or swipe a credit card in credit card reader 124 and thereafter enter their destination number on key pad 118, both of which may occur in step 306. Then, a test is made in step 307, to determine if a card was swiped in credit card reader 124 or otherwise entered in telephone station 114, or if the information was entered manually.

If it is determined in step 307 that a caller swiped their card after receiving dial tone, platform 102 screens the card for valid format in step 311. If a format check in step 313 fails, platform 102 prompts the caller to re-enter their card number in step 315, and processing continues with step 307, as described below. (Note that the process can be modified to include multiple attempts at card entry, such that, after a second attempt (or some other predetermined number of attempts), the platform will play an announcement instructing the caller to start again by pressing the "New" button, or hanging up.

If the card information passes the format check in step 313, a test is then made in step 308 to determine whether the card being used is a telephone calling card, or a commercial credit card. This difference is important (except for 800 or toll free calls), since calls originated using a calling card are completed via OSPS, while calls originated using a commercial credit card are completed as a 1+ (direct dial) call. In either event, however, the next step, step 310 or 312, involves connection of the dialed telephone number (DTN). Note here that the caller has the flexibility to provide the destination number in various formats. Specifically, the caller may enter a speed dial code, a domestic number, '0' for a telephone operator, or an international number. Platform 102 collects and screens the destination number for valid format as necessary, in steps 310 and 312. If the destination is not valid, the caller is prompted to re-enter their information.

If it was determined in step 308 that a commercial credit card was used, a validation check is performed in step 314. This is done by forwarding a query from platform 102 to database 110, either directly or via switched telecommunications network 105. Next, in steps 316 and 318, platform 102 checks to determine whether or not the call is a toll free call, e.g., a call placed to an 800 number. Note here that in the context of calls completed from airplanes, even 800 calls are billed to the calling party, with respect to airtime. However, 800 calls are treated differently than conventional calls, because they must be completed over the long distance network of the telecommunications carrier selected by the 800 subscriber. Thus, if a positive result is obtained in step 316 or 318, platform 102 collects billing information from the caller, validates it, and completes the call via LEC network 103 in step 320 or 322, respectively.

If a negative result is obtained in step 316, platform 102 initiates an outgoing call to OSPS 115 in step 324. Platform 102 sends the destination number and the ANI of platform 102 to OSPS 115. Once this information is transmitted to OSPS 115, platform 102 connects the voice path between the caller and OSPS 115, so the caller can input their credit card number or request an operator by entering '0'. If the caller enters '0' for a destination number, the caller is connected with an operator. OSPS 115 then validates the telephone calling card in real-time. If the card is valid, the call is routed to the desired destination. If the card is invalid, OSPS 115 plays an announcement asking the caller to re-enter their card number. If an invalid entry is again encountered, the call is passed back to platform 102, where the caller can either place another call by pressing "NEW" button 121 and starting the process again, or the caller may hang-up.

If the result of step 318 is negative, meaning that the call is a normal (non-toll free) call made using a commercial credit card, platform 102 is arranged to complete the call in step 326 via switched telecommunications network 105 as a 1+ call.

Figure 4:
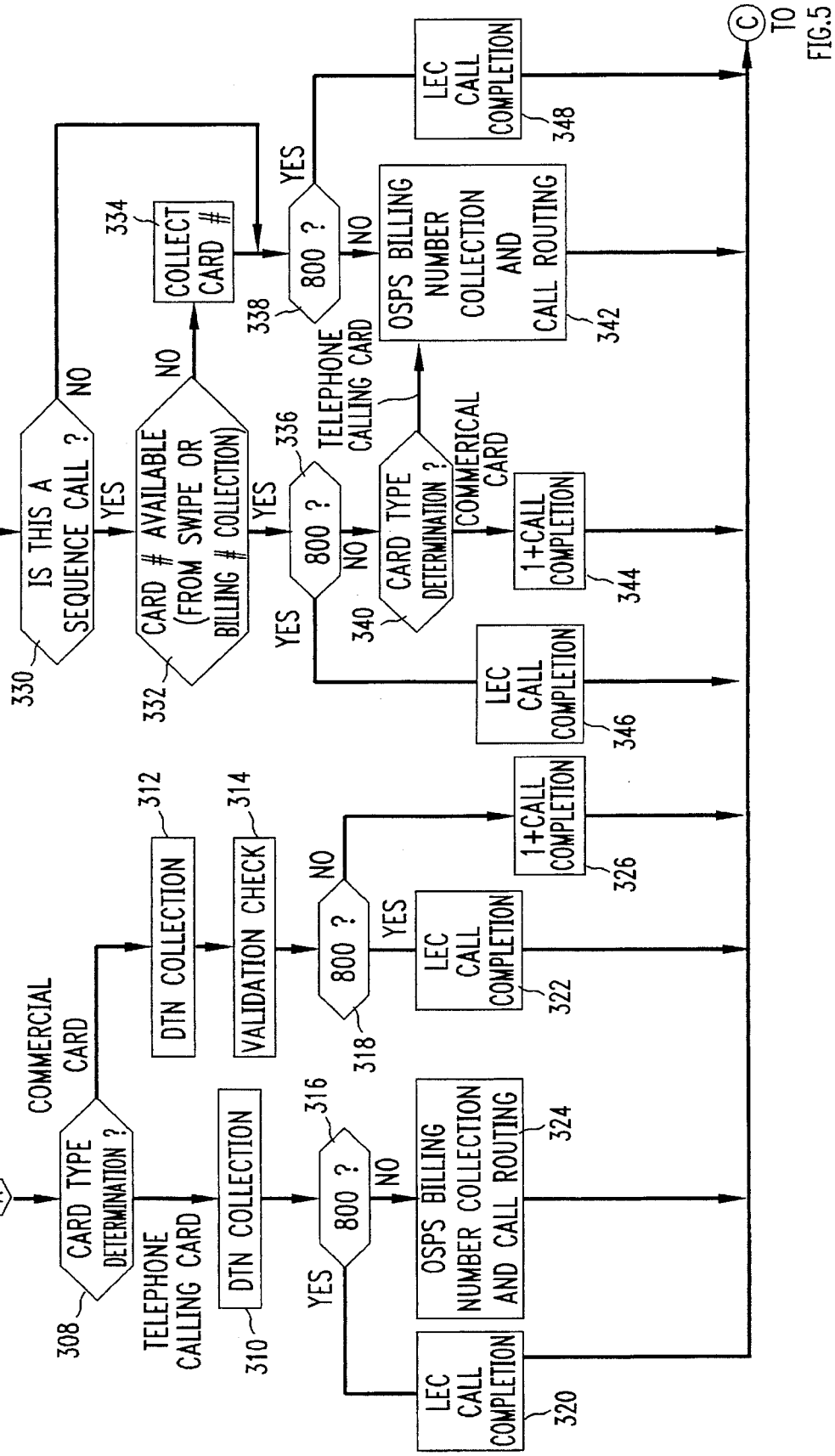

Returning now to FIG. 3, the process for a call made without a credit or calling card is somewhat different from that just described. Specifically, if the result of step 307 is negative, the DTN is collected and screened in step 309, in the same manner as described above in connection with steps 310 and 312. Next, (see FIG. 4), a determination is made in step 330 as to whether or not the call is a sequence call, meaning that the call was initiated as a result of depressing the "NEW" button 121. This is done for the convenience of the caller, so that billing information does not have to be repeatedly entered for each call in a sequence of calls.

If a negative result occurs in step 330, a determination is made in step 338 as to whether the call was to a toll free number. As explained above in connection with steps 316, 320 and 324, if the result is positive, LEC call completion is the result in step 348, while if the result is negative, the call is routed to OSPS 115 in step 342.

If, on the other hand, a positive result occurs in step 330, a determination is made in step 332 as to whether a card number is available in platform 102 from a previous call. If not, the card number is obtained in step 334, and the process of steps 338, 342 and 348 is repeated. If a card number is available, then a determination is made in step 336 as to whether the call is to a toll free number. If so, the call is completed using LEC 103 in step 346; if not, a further test is made in step 340 as to card type. If the card is a telephone calling card, the call is completed via OSPS 115 in step 342. On the other hand, if the card is a commercial credit card, the call is completed via switched telecommunications network 105 as a conventional long distance call, in step 344.

Figure 5:
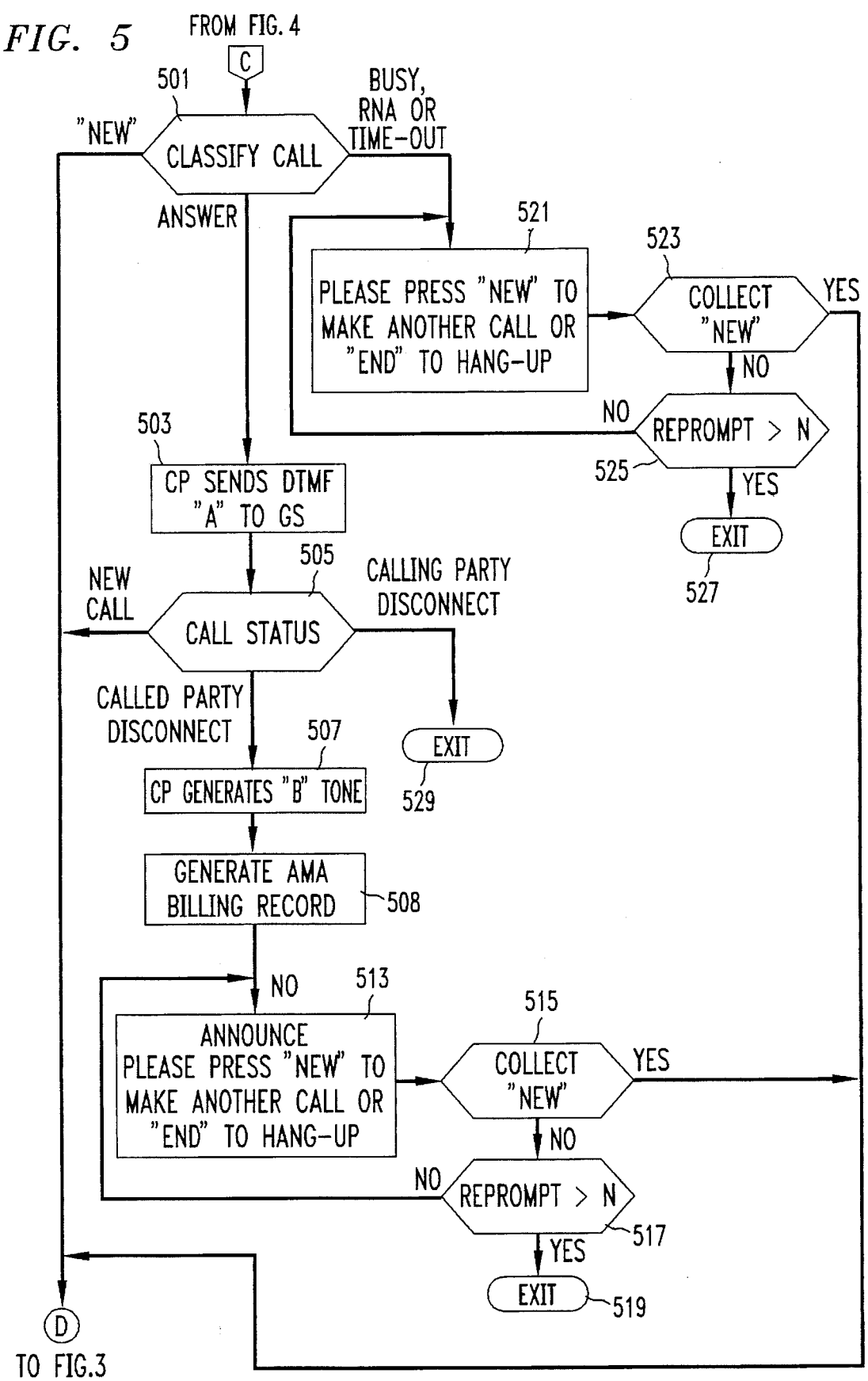

Referring now to FIG. 5, the portion of the process performed after a call is initially routed is illustrated. Once a call is routed, the caller may encounter three conditions, namely, busy, ring no-answer, or answer. During this time, platform 102 monitors the connection to determine the disposition of the call, in step 501. If platform 102 detects a busy condition, ring no-answer, or a time-out, platform 102 plays an announcement to the caller in step 521 requesting the caller to press "NEW" button 121 to make another call or hang-up. If that button is pressed, as indicated by a positive result in step 523, the process is repeated beginning at step 306 of FIG. 3. Until "NEW" button 121 is pressed, a negative result is obtained in step 523, so that, if the number of reprompts does not exceed a predetermined value N in step 325, the announcement of step 521 is repeated. If the number of reprompts exceeds the value N, the process is ended in step 527.

If the call is answered, platform 102 sends a specific DTMF signal towards ground station 101, in step 503, as an indication that a call has been answered. This can be designated the "A" signal. Platform 102 then begins listening for calling party disconnect or called party disconnect in branching step 505.

If it is determined in step 505 that the called party disconnects, platform 102 sends a DTMF 'B' tone towards ground station 101 in step 507, indicating the call has been disconnected, and also generates an AMA billing record (in step 508) if the call was billed to a commercial credit card. Platform 102 prompts the caller, in step 513, to press "NEW" button 121 to make another call or hang-up. The process for recognizing activation of the NEW button, and reprompting, performed in steps 515, 517 and 519, is the same as described above in connection with steps 523, 525 and 527. If it is determined in step 505 that the calling party disconnects, ground station 101 clears the call connection in step 529.

Other capabilities available to the caller during the course of a call include sequence calling, speed dial codes, free calling and blocked calls. If a caller wishes to make a sequence call, the caller may press "NEW" button 121 on telephone station 114. Once platform 102 receives an indication that the caller wishes to initiate a sequence call, the process of FIG. 3 returns to step 305, and platform 102 plays dial tone to the caller. As stated previously, if the caller enters a destination number in response the dial tone, the caller will not be asked for billing information again. Instead, platform 102 uses the billing information provided on the previous call, revalidates it, and then routes the call to the desired destination.

Various modifications and adaptations may be made to the present invention by those skilled in the art. For this reason, it is intended that the invention be limited only by the appended claims.

What is claimed is:

1. A system for completing air-to-ground telephone calls from a caller on an aircraft to a called party on the ground, said system comprising:

a special purpose platform disposed in the land-based telecommunications network, means for routing all calls made from said aircraft to said platform, and means in said platform for interacting with the caller, said platform including
(a) means for collecting billing information,
(b) means for validating said billing information in real time; and
(c) means responsive to said validation means, for completing the call as either a traditional 1+ long distance call, or as a 0+ operator assisted call.

2. The invention defined in claim 1 wherein said billing information collecting means includes means for determining if said call was made using a telephone calling card or a commercial credit card, and said call completing means includes means for completing said call as a traditional 1+ call if said call was made using a commercial credit card and for completing said call as a 0+ operator assisted call if said call was made using a telephone calling card.

3. The invention defined in claim 1 wherein said system further includes means for determining if said billing information was entered by swiping a credit card in a credit card reader.

4. The invention defined in claim 1 wherein said system further includes means for completing a series of telephone calls after an initial call without additional entry of said billing information.

5. A method of completing air-to-ground telephone calls from a caller on an aircraft to a called party on the ground, comprising the steps of:

routing a call made from said aircraft to a special purpose platform disposed in the land-based telecommunications network, collecting billing information in said platform, validating said billing information in real time, and responsive to validation, completing the call as either a traditional 1+ long distance call, or as a 0+ operator assisted call.

6. A system for completing an air to Found telephone call, said system comprising means in an aircraft for routing said call to a ground station, means in said ground station for routing said call to a call processor, means in said call processor for determining the type of billing arrangement used to place said call, and means responsive to said determining means for (a) routing said call to a destination via an operator services position system if said call was placed using a telephone calling card billing arrangement and for (b) routing said call to a destination via a switched telecommunications network if said call was placed using a commercial credit card billing arrangement.

* * * * *